United States Patent [19]

Newton, III

[11] 4,001,125
[45] Jan. 4, 1977

[54] LUBRICANT FOR MANDRELS, FORGING DIES, MOLDS AND THE LIKE
[75] Inventor: Archibald R. Newton, III, Emlenton, Pa.
[73] Assignee: Grafo Colloids Corporation, Sharon, Pa.
[22] Filed: June 9, 1975
[21] Appl. No.: 584,722
[52] U.S. Cl. .................................. 252/29; 252/49.5
[51] Int. Cl.² ......................................... C10M 1/10
[58] Field of Search ............................ 252/29, 49.5
[56] References Cited

UNITED STATES PATENTS

| | | | |
|---|---|---|---|
| 1,440,356 | 12/1922 | Morrell | 252/49.5 |
| 2,166,173 | 7/1939 | Montgomery | 252/49.5 |
| 2,176,879 | 10/1939 | Bartell | 252/29 |
| 2,588,625 | 3/1952 | Ferner et al. | 252/29 |
| 2,722,515 | 11/1955 | Reamer | 252/49.5 |
| 2,735,814 | 2/1956 | Hodson et al. | 252/29 |
| 3,843,529 | 10/1974 | Bertrand | 252/49.5 |

Primary Examiner—Delbert E. Gantz
Assistant Examiner—Andrew H. Metz
Attorney, Agent, or Firm—Brown, Murray, Flick & Peckham

[57] ABSTRACT

A lubricant for glass molds and forging dies and for mandrels used in seamless tube manufacture is formed from a mixture consisting principally of gilsonite powder and water, but containing a dispersant and a thickener. When the lubricant is intended for mandrels, sufficient thickener is used to give it a paste-like consistency similar to a light grease.

13 Claims, No Drawings

LUBRICANT FOR MANDRELS, FORGING DIES, MOLDS AND THE LIKE

In the making of seamless pipes or tubes a relatively short cylindrical shell at red heat and encircling a long mandrel of smaller diameter than the internal diameter of the shell is then run through a mill where the rolls squeeze it down onto the mandrel to simultaneously reduce the thickness of the wall of the shell and increase its length. Before the shell and mandrel are assembled, a lubricant is applied to the mandrel so that the shell will not bind on it as it is elongated and also so that the mandrel can more readily be withdrawn from the finished pipe. Heretofore, the principal lubricant has been a heavy residual oil known as black oil. During the pipe-sinking operation, the heat from the shell flashed off the lighter highly combustible fractions of the oil, causing vapor, flames, smoke and fumes to issue from between the shell and the mandrel.

This pollution of the atmosphere has always been highly objectionable, but now that air pollution standards have become increasingly restrictive, efforts are being intensified to find a suitable replacement for the black oil. Another factor making it highly desirable to find a replacement is the steadily increasing cost of the black oil. Various substitutes have been suggested or tried, but all of them have disadvantages. Some do not lubricate well enough to prevent undue stresses from being exerted on the rolling machinery. Other fail to permit the required elongation of the pipe, and still others are too difficult to apply to the mandrel or are too expensive. If a dry lubricant such as graphite or coal dust is used, there is the problem of retaining the material on the mandrel before and during the sinking operation. If a water-soluble polymer is added to a mixture of graphite and water to facilitate spreading it over the mandrel before insertion in the shell, the steam that the hot shell forms from the water blows most of the mixture out of the shell. In addition, the heat quickly disintegrates any surface binding power of the remaining water-soluble polymer, so that any remaining graphite or carbonaceous particles are of limited effectiveness. This makes it difficult to pull the mandrel out of the finished pipe. An emulsion of asphalt and water could serve as a lubricant, but its use raises serious problems and there are high costs in handling the asphalt.

It is among the objects of this invention to provide a lubricant suitable for mandrels, forging dies, glass molds and the like, which is inexpensive, which is easy to apply to the surfaces that are to be lubricated, and most of which remains in place while in use.

In accordance with this invention, gilsonite is used as the principal ingredient of the lubricant. Gilsonite, which is a mined material, is an almost pure bitumin that is unusually stable at elevated temperatures. Gilsonite, as mined, is extremely brittle at ambient temperatures and, therefore, can readily be pulverized to a fine powder preferably of less than 100 microns in size. This gilsonite powder is mixed with a limited quantity of water, to which a suitable water-soluble dispersant also is added to wet the particles so that the powder will disperse itself uniformly in the mixture. Among dispersants that can be used are lecithin oil and "Tamol", which is a sodium salt of an organic acid. Any one of a number of sulfonate compounds likewise can be used. The dispersant generally will form from 1 to 10% of the weight of the solids in the mixture. The major part of the mixture, apart from the water and as measured by weight, is the gilsonite powder. It may run as high as 95 weight percent of the ingredients of the mixture other than water.

The mixture also contains a thickener. When the lubricant is intended for mandrels used in the forming of seamless pipe, enough thickener is used to make the lubricant viscous enough to stay in place when it is applied to a mandrel, and not drip off. Sufficient thickener is used to give the lubricant the consistency of a smooth paste or a light grease. It should be quite viscous, except not so viscous as to prevent it from being sprayed onto the mandrel by the use of ordinary grease pumping apparatus. The thickener will form from between 1 and 3% by weight of a mixture in which the water is around 50% by weight of the mixture. The thickener is a water-soluble polymer that makes the lubricant gel-like and smooth. Various known thickeners can be used, such as cellulose, methyl cellulose, hydroxyethyl cellulose, sodium carboxymethyl cellulose, acrylic compounds or starch-type materials. Theoretically, any anionic or non-ionic polymer can be considered, but, of course, a complex polymer that would become toxic or highly corrosive at high temperatures would not be desirable. Cationic polymers that flocculate suspended solids obviously would not be suitable. The thickener usually is added to the mixture in the form of a powder.

The lubricant can be applied to a mandrel in any suitable manner, but preferably by pumping it with normal grease handling equipment to a set of nozzles surrounding the mandrel as the mandrel is moved toward and into the red-hot shell that is to be formed into a pipe. Upon introduction of the lubricated mandrel into the hot shell the lubricating paste resists the dislodging forces of the limited water vapor emission and becomes even firmer during drying. Although some of the lubricant may be blown out of the shell by the rapid emission of the volatile gases between the hot shell and the mandrel, sufficient lubricant for the desired purpose will remain in place because it was in a higly concentrated form that allowed it to be applied to the mandrel sparingly instead of having to be flooded onto the mandrel as is the practice with black oil. As the water leaves the lubricant, the gilsonite is melted by the heat of the shell and becomes spread evenly between the mandrel and the shell under the high working pressures in the mill. During working, the bitumin is slowly carbonized, leaving a combination of carbonaceous powder and glaze on the surface of the mandrel, which is thereby easily withdrawn from the finished pipe. In actual practice it has been found that with the lubricant disclosed herein the vapor, smoke and flames were reduced about 90% compared with the use of black oil as a mandrel lubricant.

To further ease the withdrawal of the mandrel from the formed pipe, powdered graphite can be incorporated in the lubricant. This graphite is retained in place by the molten gilsonite. It is proposed to use considerably less graphite powder than gilsonite powder; for example, only about two-thirds as much, although equal parts are satisfactory. In one formulation there is about 29% gilsonite, 19.5% graphite, about 49.75% water, about 1.25% thickener, and about one-half of 1% of dispersant. All of these percentages are by weight. In some cases it may be desirable to use less than one-half of 1% of a preservative to reduce the chance of bacterial action that would affect the smoothness of the lubricant. The preservative can be formaldehyde, pine oils or phenylmercuric compounds, for example.

The following formulation also is satisfactory:

|  | PARTS PER 100 BY WEIGHT |
|---|---|
| Gilsonite Powder | 40 – 60 |
| Dispersant | .50 – 2.5 |
| Thickener | 1 – 3 |
| Preservative | 0 – .5 |
| Water | Remainder |

If desired, graphite powder can be substituted for up to about half of the gilsonite.

If the lubricant is to be applied to forging dies or other hot surfaces, less thickener is required, because since the lubricant is applied to hot surfaces the water is driven off immediately without disturbing the gilsonite, which dries on the hot surfaces at once. For the same reason, more water can be used in the lubricant for more even application of the lubricant to the dies, as long as there is enough gilsonite in the mixture to properly lubricate the dies after the water has vaporized. The thickener helps the lubricant to maintain a homogeneous character with only limited agitation.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a lubricant composition for high temperature use with mandrels, forging dies and molds comprising a dispersion of a solid lubricant powder, water, a thickener and a dispersant; the improvement wherein said solid lubricant powder comprises gilsonite.

2. An improved lubricant composition according to claim 1, in which the weight of said water is about 50% of the weight of said mixture, and said thickener forms between 1% and 3% by weight of said mixture.

3. An improved lubricant composition according to claim 1, in which said thickener is a water-soluble non-cationic polymer.

4. An improved lubricant composition according to claim 1, including sufficient thickener to give said mixture the form of a paste.

5. An improved lubricant composition according to claim 4, in which said paste has the consistency of a light grease.

6. An improved lubricant composition according to claim 1, in which the major part of said mixture by weight, other than water, is said gilsonite powder.

7. An improved lubricant composition according to claim 6, in which up to approximately 95 weight percent of said mixture, other than water, is said gilsonite powder.

8. An improved lubricant composition according to claim 1, in which said approximately 50% of said mixture by weight is water.

9. An improved lubricant composition according to claim 1, further including graphite powder, there being at least as much gilsonite powder in said mixture as graphite powder.

10. An improved lubricant composition according to claim 9, in which said gilsonite and graphite powders together form about 40 to 60 weight percent of said mixture.

11. An improved lubricant composition according to claim 1, in which said gilsonite powder forms from about 40 to 60 weight percent of said mixture, and said dispersant forms from about 1% to 10% of the weight of the solids in the mixture.

12. An improved lubricant composition according to claim 1, including from zero graphite powder to an amount substantially equal to the amount of gilsonite powder, said powder forming from about 40 to 60 weight percent of said mixture, said dispersant forming from about 0.50 to 2.5 weight percent of the mixture, and said thickener forming from about 1 to 3 weight percent of the mixture.

13. A lubricant according to claim 1, further including graphite powder forming substantially 19.50 weight percent of said mixture, said gilsonite powder forming substantially 29 weight percent of said mixture, said thickener forming substantially 1.25 weight percent of said mixture, said dispersant forming substantially 0.50 weight percent of said mixture, and the balance of said mixture being said water.

* * * * *